United States Patent [19]

Werntz

[11] 4,006,816
[45] Feb. 8, 1977

[54] ARTICLE ANTISCRAMBLING AND ACCUMULATING ROLLER CONVEYOR

[75] Inventor: Charles W. Werntz, Ferguson, Mo.

[73] Assignee: Alvey Inc., St. Louis, Mo.

[22] Filed: May 30, 1975

[21] Appl. No.: 582,206

[52] U.S. Cl. .............................. 198/781; 198/790
[51] Int. Cl.² ........................................ B65G 13/07
[58] Field of Search ............... 198/34, 127 R, 781, 198/790; 64/30 R, 30 E, 30 A; 29/124, 125, 130, 116 R

[56] References Cited
UNITED STATES PATENTS

| | | | |
|---|---|---|---|
| 2,712,377 | 7/1955 | Eggleston | 198/127 R |
| 2,836,284 | 5/1958 | Gilliatt | 198/127 R |
| 3,323,636 | 6/1967 | Gotham | 198/127 R |
| 3,337,023 | 8/1967 | Kohl et al. | 198/127 R |
| 3,513,960 | 5/1970 | Adams | 198/34 |
| 3,610,406 | 10/1971 | Fleischauer | 198/127 R |
| 3,667,589 | 6/1972 | Constable | 198/127 R |

Primary Examiner—Evon C. Blunk
Assistant Examiner—Richard K. Thomson
Attorney, Agent, or Firm—Gravely, Lieder & Woodruff

[57] ABSTRACT

An article antiscrambling and accumulating conveyor in which a series of principal article propelling rollers are aligned along the conveying path and driven by suitable means, in which the principal propelling rollers are aligned with supplementary article supporting rollers having an impositive driving connection with the principal rollers through drive transmission means, so that articles of varying size are all propelled by the principal propelling rollers to avoid the problem of wide articles tending to turn or skew against narrower articles on the conveyor. A conveyor of this character develops propelling forces under an accumulated group of articles in a common line, regardless of the variations in dimensions of the articles being accumulated.

6 Claims, 4 Drawing Figures

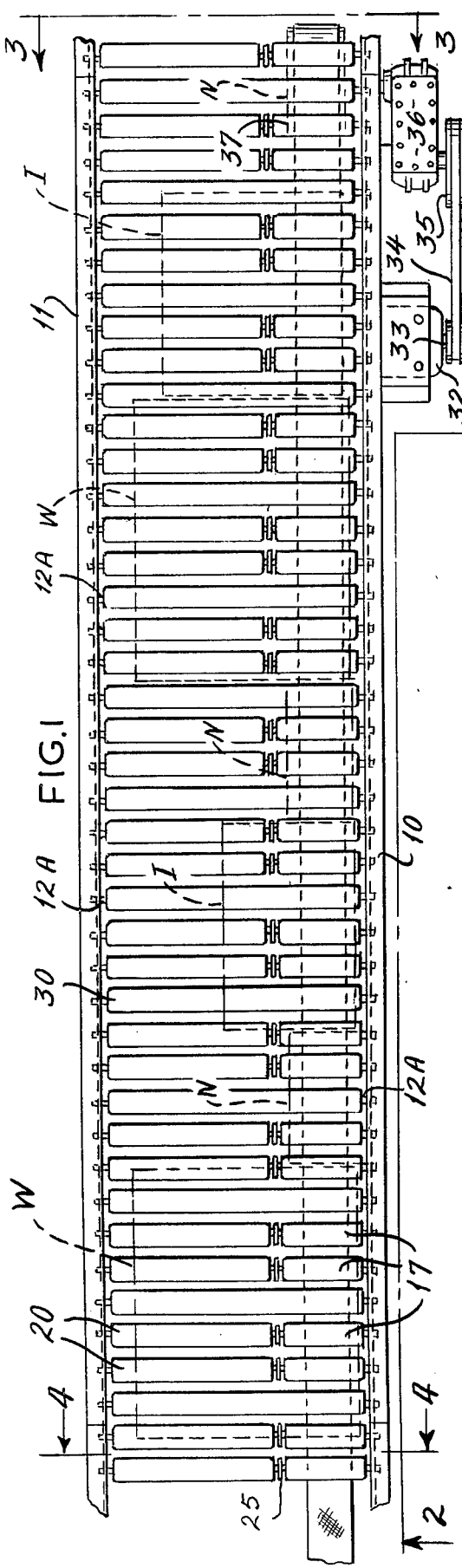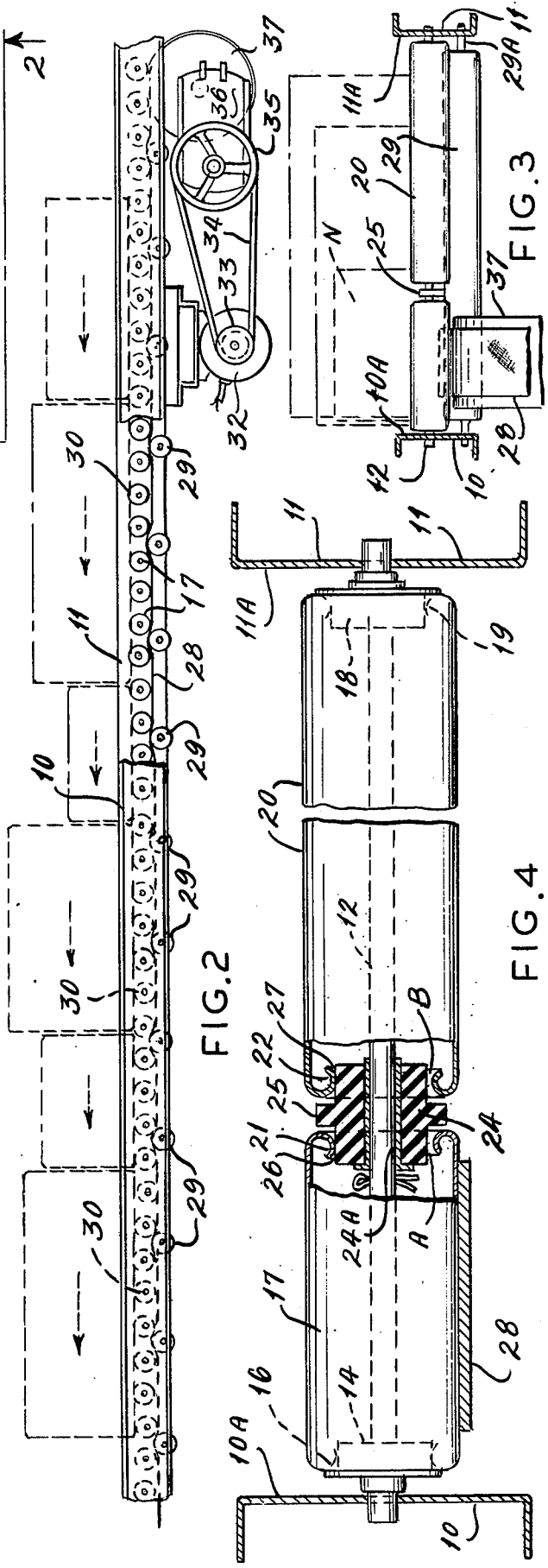

ARTICLE ANTISCRAMBLING AND ACCUMULATING ROLLER CONVEYOR

BRIEF SUMMARY OF THE INVENTION

This invention relates to article antiscrambling and accumulating roller conveyors in which a unique and simple arrangement of article propelling and article supplementary carrying rollers functions to propel articles from a common drive alignment in the conveyor.

The transportation of articles of mixed sizes by live roller conveyors has not in the past achieved the ability to prevent wider articles turning on narrower articles and thereby scramble the alignment and cause "log jams" when a narrow article is stopped in front of a wider article while the rollers continue rotation. Some conveyors achieve the necessary ability to transport articles of mixed sizes by enforcing the development of a gap or space between articles in a singulation order, or by spacing articles with the use of article actuated sensors which interrupt the drive under some articles. Scrambling of articles of mixed sizes during conveyance, and especially during accumulation, is the result of unbalanced forces acting between articles of different sizes where the full length of the rollers is engaged with or driven by the usual under the roller drive means.

The present roller conveyor accomplishes the needed requirements of the art of conveying mixed width articles on live roller conveyors and prevents turning, jamming and losing the desired orientation by a unique and simple drive between the source of power and the article carrying rollers. The conveyor consists of means for developing the drive in a common line for portions of the roller means, providing supplementary article supporting rollers, and utilizing low friction means between the drive rollers and supplementary rollers such that if conveyor line blockage occurs the drive rollers will be able to rotate with minimum drive effort exerted on the articles while the supplementary rollers cease to contribute any drive effort.

The present article transporting roller conveyor lends itself to variations in the degree of drive friction needed when transporting articles having size variations, so that the transport of mixed size articles may be achieved without scrambling the articles in the event of blockage or accumulation along the conveyor. Such a conveyor has a distinct advantage for conveying articles which vary in size and are haphazardly mixed on the same conveyor. Furthermore, if singulation or spacing between articles is desired the same may easily be achieved by a series of sensor controlled brakes applied to the article supporting rollers.

A preferred embodiment of this invention consists in an assembly of rollers wherein certain of the rollers combine a drive section and a supplementary section on a common axle mounted in anti-friction bearings at the opposite ends, side rails carry the axles in nonrotating fashion, low friction drive means is engaged between the sections, and means is engaged with and rotates the drive sections of the rollers.

More particularly the invention encompasses a conveyor comprising side rails, a plurality of axles fixed in and between the side rails to support anti-friction bearings adjacent the side rails, an array of drive roller sections aligned adjacent one of the side rails, article supporting supplementary rollers supported on said axles adjacent the other side rail, and means to drive the array of aligned drive roller sections for conveying the articles.

BRIEF DESCRIPTION OF THE DRAWINGS

The present invention is illustrated in a presently preferred embodiment in the accompanying drawings, wherein:

FIG. 1 is a plan view of as much of a roller conveyor as will illustrate the principles by which drive rollers are mounted in cooperative relation along the length of the supporting side rails;

FIG. 2 is a side view of the conveyor taken at line 2—2 in FIG. 1 and with portions broken out to reveal details;

FIG. 3 is an end view taken at line 3—3 in FIG. 1; and

FIG. 4 is a sectional view of a typical drive roller and supplementary roller of which there are many distributed along the conveyor of FIGS. 1 and 2.

DETAILED DESCRIPTION OF THE PREFERRED EMBODIMENT

FIGS. 1 to 4 set forth details of a preferred article transporting roller conveyor assembly having elongated and spaced side rails 10 and 11 which are channels with the flanges directed outwardly so that the web 10A and 11A (FIG. 3) which are in facing relation may act as guides for articles to be conveyed. The webs of these rails are punched to form hexagonal apertures in aligned pairs to receive roller supporting axles which are hexagonal shafts 12 (FIG. 4).

Each shaft 12 (FIG. 4) adjacent rail 10 supports an anti-friction bearing assembly 14. The relatively rotatable outer race of the assembly 14 is press fitted into the inwardly rolled lip 16 on the article propelling and supporting roller 17. The opposite end of each shaft 12 adjacent the rail 11 carries an anti-friction bearing assembly 18 of which the outer race is press fitted into the rolled lip 19 of the supplementary roller 20. The roller 17 has a second rolled lip 21 at its inner end, and the roller 20 also has a second rolled lip 22 at its inner end which is spaced from the rolled lip 21. The lips 21 and 22 are carried on a dirve transmission element 24 which has a raised rib 25 separating two supporting surfaces 26 and 27 for the respective roller lips 21 and 22. The element 24 is carried on the shaft 12 by an adapter sleeve 24A which is held against turning on the shaft, but is loosely fitted into the bore in the element.

The above described features of assembly of the roller conveyor components are shown in FIG. 4 to have special characteristics. It is noted in this view that the inwardly turned lip 21 on the roller 17 has a larger inner diameter than the diameter of the supporting surface 26 on the transmission element 24, thereby creating a running clearance or eccentric space A, except where the roller lip 21 must engage the surface 26 at the top of the vertical diameter. The engagement is very close to being a line contact and it is at this line of engagement where the drive for the element 24 occurs. The supplementary roller 20 also has its inner rolled lip 22 supported on the element 24 at the top of the vertical diameter because the lip 22 has a running clearance or eccentric space B with element 24. The purpose for this eccentric mounting of the lips 21 and 22 on the surfaces 26 and 27 respectively will appear presently.

The article propelling roller 17 is engaged by the surface of a drive belt 28 which runs along under the respective series of rollers 17, and is suitably supported by spaced snubbing rollers 29 carried by suitable axles 29A supported in the side rails 10 and 11 (FIGS. 2 and 3). There are, of course, many such snubbing rollers 29, each being mounted in the spaced manner seen in FIG. 2, so that the required drive contact may be established at each pair of roller 17. Each pair of rollers 17 with the cooperating supplementary rollers 20 is spaced apart by an idler roller 30 which is normally free of contact with the belt 28 but does support articles moved by the conveyor. The idler rollers 30 are mounted on axles 12A carried between the side rails 10 and 11, and rotate by contact with moving articles. Thus, when articles accumulate and stop movement these rollers 30 also stop rotating, as can be appreciated upon inspection of FIG. 1.

The operation of the conveyor above described is as follows: a drive motor 32 supported (FIG. 2) under the conveyor is connected to drive the pulley (or gear) 33. The pulley 33 transmits the power to pulley 35 by a drive belt 34. On operation of the pulley 35 a suitable gear drive 36 drives the belt pulley 37 which, in turn, drives the endless belt 28 and this results in operation of drive rollers 17. It is not necessary to show the return portion of belt 28. The article propelling rollers 17 are supported by the end lips 16 and 21, and lip 21 drives the element 24 by the friction drag between lip 21 and surface 26 caused by the weight of the roller 17 on element 24. Now as articles are placed on the conveyor, the weight thereof will increase the contact pressure between the roller lip 21 and the surface 26, thereby improving the article propelling effort at the before noted line contact. In this arrangement it is important to have the diameter of the rib 25 on the element 24 sufficiently smaller than the outer diameter of the article propelling roller 17 so that articles are sure not to engage the same. The drive effort exerted by belt 28 on roller 17 is passed through element 24 to surface 27 and then through the inner lip 22 on the supplementary roller 20. Since this drive to roller 20 is impositive, the roller may be relatively easily stopped from rotating by hand, while the drive to the adjacent roller 17 is unaffected since it is in direct engagement with the belt 28.

Looking at FIGS. 1 and 2, it is readily seen that the conveyor assembly has an array of pairs of rollers 17, each pair with an aligned pair of supplementary rollers 20, and between each pairs of rollers 17 and 20 there is an idler roller 30 responsive to the movement or stoppage of articles engaged thereon. The drive belt 28 is aligned to drive the rollers 17 so that the article propelling effort is confined to one side of the conveyor width at roller 17, while rollers 20 supplement the article propulsion by being powered only through the drive transmission elements 24. The rollers 17 are approximately long enough to match the width of the narrowest article to be conveyed, and rollers 20 make up the remainder of the width of the conveyor between the side rails 10 and 11. In FIG. 1 there has been shown in phantom outline narrow articles N, intermediate width articles I, and wide articles W, arranged in mixed or random alignment.

The term "scramble" is intended to refer to the action of the articles, especially during line blockage or accumulation, when the propelling effort on the articles is not in a common line, such as a wide article engaging a narrow article off-center. The action is that the wide article will tend to rotate or skew on the narrow article and scramble the original orientation, with the liklihood that jamming will occur. Conventional roller conveyors do not recognize and take into account this scrambling action because the drive is delivered over the full length of the rollers on which articles are carried. In this invention, the roller drive is split into two aligned sections extending along the conveying path, and the positive drive brought to one of the split sections forms a well defined common alignment of drive at one side of the conveyor width. Any known or available means is used to push all articles toward rail 10 and into an alignment over the split section which furnishes the drive for maximum propelling effort. In addition the supplementary drive rollers 20 are provided with the unique characteristic that the drive to these supplementary rollers is impositive, since it is derived from the drive section 17, and may be stopped merely by stoppage of an article supported thereon. As noted above when any roller 20 is stopped the adjacent idler rollers 30 will also stop. This feature prevents wide articles W abutting a stalled narrow article N and going into a turn to scramble the articles.

The foregoing description has referred to a presently preferred embodiment of a conveyor which is uniquely arranged to convey a line of articles which are mixed in sizes or shapes so that narrow articles may be intermingled with wide articles. This unique ability is accomplished by an array of rollers which define the conveyor path being split into two sections aligned along the path, first sections being in engagement with the principal drive means, and second sections being driven from the first sections through friction drive transfer elements. The latter elements may be formed from such low friction materials as phenolic laminates, oil saturated wood, Delrin, nylon, or equivalent materials which change very little, if at all, with changes in humidity or temperature in the ambient air.

What is claimed is:

1. An article antiscrambling conveyor comprising: side rails in spaced relation; shafts extending between said side rails; an array of rollers carried by said shafts, certain of said array of rollers including first and second roller sections on the same shaft having the same diameter and being in position so that articles are supported by both sections, all of said first roller sections being adjacent one side rail and being of less length than said second roller sections as measured along said shafts, and said first and second roller sections having open ends in spaced facing relation; first drive means engaged with said first roller sections to drive the same and deliver direct inline propulsion to articles supported thereon for movement on the conveyor; and second drive means operatively supported on said shafts and having opposite ends engaging in said open ends of said first and second sections of said rollers simultaneously to transmit the propulsion of articles by said first roller sections to said second roller sections through said second drive means, said engagement of said roller sections with said second drive means being eccentric to provide a running clearance.

2. The conveyor set forth in claim 1 wherein said second drive means is a non-metallic low friction material providing substantially stable friction characteristics with changes of temperature and humidity.

3. The conveyor set forth in claim 1 wherein said open ends of said first and second roller sections are larger in diameter than the said second drive means such that the eccentric running clearance engagement thereof is generally a line contact.

4. The conveyor set forth in claim 1 wherein said roller sections and said second drive means are formed from dissimilar materials, and said opposite ends of said second drive means are smaller in diameter than said open ends of said first and second roller sections and develop an impositive drive therebetween proportional to the weight of the supported articles.

5. The conveyor set forth in claim 1 wherein said array of rollers includes idler rollers extending the full width between said side rails and being interspersed with said certain rollers having said first and second sections, said idler rollers being rotated through contact with articles being moved by said certain of said array of rollers, said idler rolls aiding in maintaining article orientation during article conveyance.

6. An article antiscrambling conveyor for moving mixed sizes and shapes of articles comprising: spaced apart rails defining the sides of a conveying path and being in position for retaining the articles in such path; a plurality of article carrying rollers supported by said rails to form the conveying path, certain of said rollers being idler rollers extending between said rails and certain others being divided into first sections adjacent one rail so as to be in aligned relation at one side of the conveying path and second sections extending from said first sections to the other rail, said first and second sections of said certain others of said rollers jointly supporting the articles and having adjacent and facing open ends; integrally formed and rotatable support means engaged in and providing common support for said first and second sections between said adjacent open ends; and drive means engaged with said first sections of said certain other of said rollers to propel articles in contact therewith along the conveyor path, the rotation of said first roller sections being transferred by said integrally formed and rotatable support means to said second roller sections to supplement the propulsion of articles and being transferred by articles of said idler rollers, whereby upon article stoppage said idler rollers are held against rotation and counteract any article driving effort by said second roller sections engaged under the stopped article.

* * * * *